Oct. 2, 1951 J. POLONSKY 2,569,948

TRANSMITTER MODULATED BY ANODE CONTROL

Filed Feb. 24, 1949 2 Sheets-Sheet 1

INVENTOR:
JOSEPH POLONSKY
By: Haseltine, Lake & Co.
AGENTS

Oct. 2, 1951 J. POLONSKY 2,569,948

TRANSMITTER MODULATED BY ANODE CONTROL

Filed Feb. 24, 1949 2 Sheets-Sheet 2

INVENTOR:
JOSEPH POLONSKY
By: Haseltine, Lake & Co.
AGENTS

Patented Oct. 2, 1951

2,569,948

UNITED STATES PATENT OFFICE 2,569,948

TRANSMITTER MODULATED BY ANODE CONTROL

Joseph Polonsky, Paris, France, assignor, by mesne assignments, to Compagnie Generale de Telegraphie Sans Fil, Paris, France, a corporation of France Application February 24, 1949, Serial No. 78,097
In France March 12, 1948

6 Claims. (Cl. 332—60)

The present invention relates to an improvement in transmitters which are modulated by anode control and in which the modulation is effected by using a class B push-push modulating stage.

The object of the invention is to provide an arrangement that enables the modulation transformer to be eliminated.

According to the invention, this result is obtained by feeding the modulated stage both on the cathode side and on the anode side and by using two suitably connected rectifying tubes associated with two chokes and a resistance shunted by a capacity.

The invention will be more clearly understood by referring to the accompanying drawings and to the description that refers thereto. In said drawings:

Fig. 1 shows a simplified typical known diagram of a system of modulation by means of a class B push-push modulating stage with a modulation transformer, said diagram being given for the purpose of explaining the invention by comparison with the prior state of the art;

Figs. 2*a* and 2*b* are the equivalent diagrams for the ultrasonic frequencies of the previous arrangement, respectively for the positive and negative half-cycles of modulation.

All the difficulties of a technical nature which are created by the class B modulation transformer are known. In particular, the considerable phase rotation introduced by the transformer between the secondary voltage and the primary voltages for the ultrasonic frequencies (between 15 kc./s. and 200 kc./s.) considerably limits the degree of negative feed-back that can be applied to transmitters which are modulated by anode control.

The phase rotation in question is essentially due to the leak inductances between the secondary winding and the two half primary windings and to the effective capacities between the primary and secondary windings and between said windings and ground.

Figure 1:
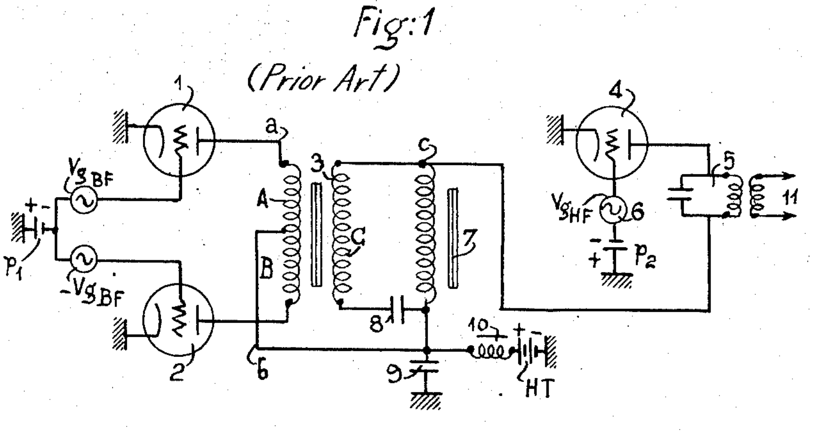
Fig:1 (Prior Art)

Fig. 1 shows a typical diagram of a class B modulator equipped with the tubes 1 and 2 and the push-push transformer 3 with two half primary windings A, B and one secondary winding C.

The grids of these tubes are excited by opposite low-frequency modulating voltages $V_{gBF}$ and $-V_{gBF}$, the grids being biassed by a voltage $p_1$. The modulated high-frequency stage comprises the tube 4, the anode oscillating circuit 5 that feeds the antenna by means of the coupling 11, the high-frequency excitation circuit 6 with the grid bias $p_2$ for said tube.

The choke 10 and the condenser 9 filter the high tension HT; the secondary C of the transformer 3 modulates the tube 4. Across the terminals of the secondary is connected the speech-choke 7 and the blocking condenser 8.

Figure 2A:
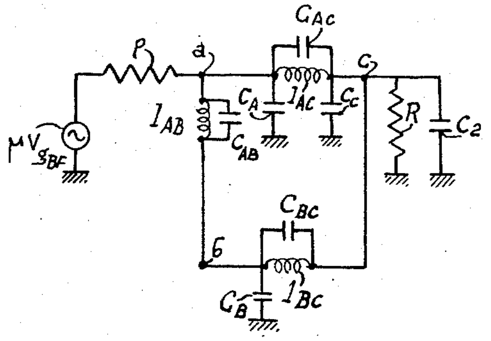
Figure 2B:
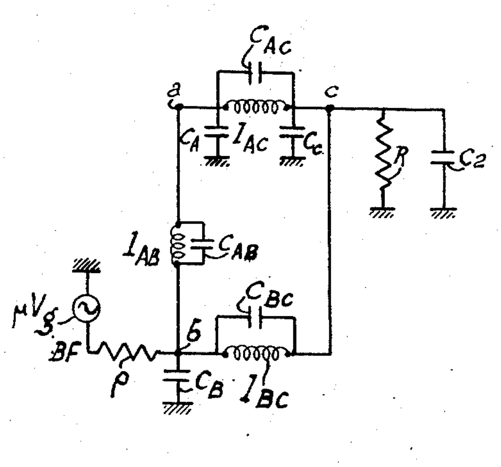

Figs. 2*a* and 2*b* show the equivalent diagrams of the modulating stage for the ultrasonic frequencies; Fig. 2*a* corresponds to the positive half-cycle of the grid of the tube 1; Fig. 2*b* corresponds to the positive half-cycle of the grid of the tube 2, $\mu$ is the amplification factor of the tubes 1 and 2, $\rho$ is their internal resistance. The points *a*, *b*, *c*, correspond to those of Fig. 1. $l_{AC}$, $l_{BC}$ and $l_{AB}$ are respectively the leak inductances between the two half-primaries A, B and the secondary C and also the leak inductance between the two half-primaries A and B.

$C_{AC}$, $C_{BC}$ and $C_{AB}$ are the corresponding effective capacities. $C_A$, $C_B$ and $C_C$ are the effective capacities between each of the three windings and ground.

R and $C_2$ are respectively the load resistance of the modulator and the capacity which are due to the modulated high-frequency stage.

This system of inductances and capacities produces a very rapid phase rotation as soon as the frequency exceeds 20 to 25 kc./s. This phase rotation is more objectionable as it is not accompanied by a considerable decrease in the amplitude of the secondary voltage.

In order to overcome this drawback, the device according to the invention and described hereinafter enables the class B modulation transformer to be eliminated and a direct connection to be effected between the modulator and the high-frequency stage, while providing a satisfactory matching between the modulator and the modulated stage.

On the other hand, in this device according to the invention, the efficiency of the class B modulator remains high, the degree of modulation may reach 100%, the high voltage rectifier is common to the modulator and to the modulated high-frequency stage.

Figures 3, 3A:
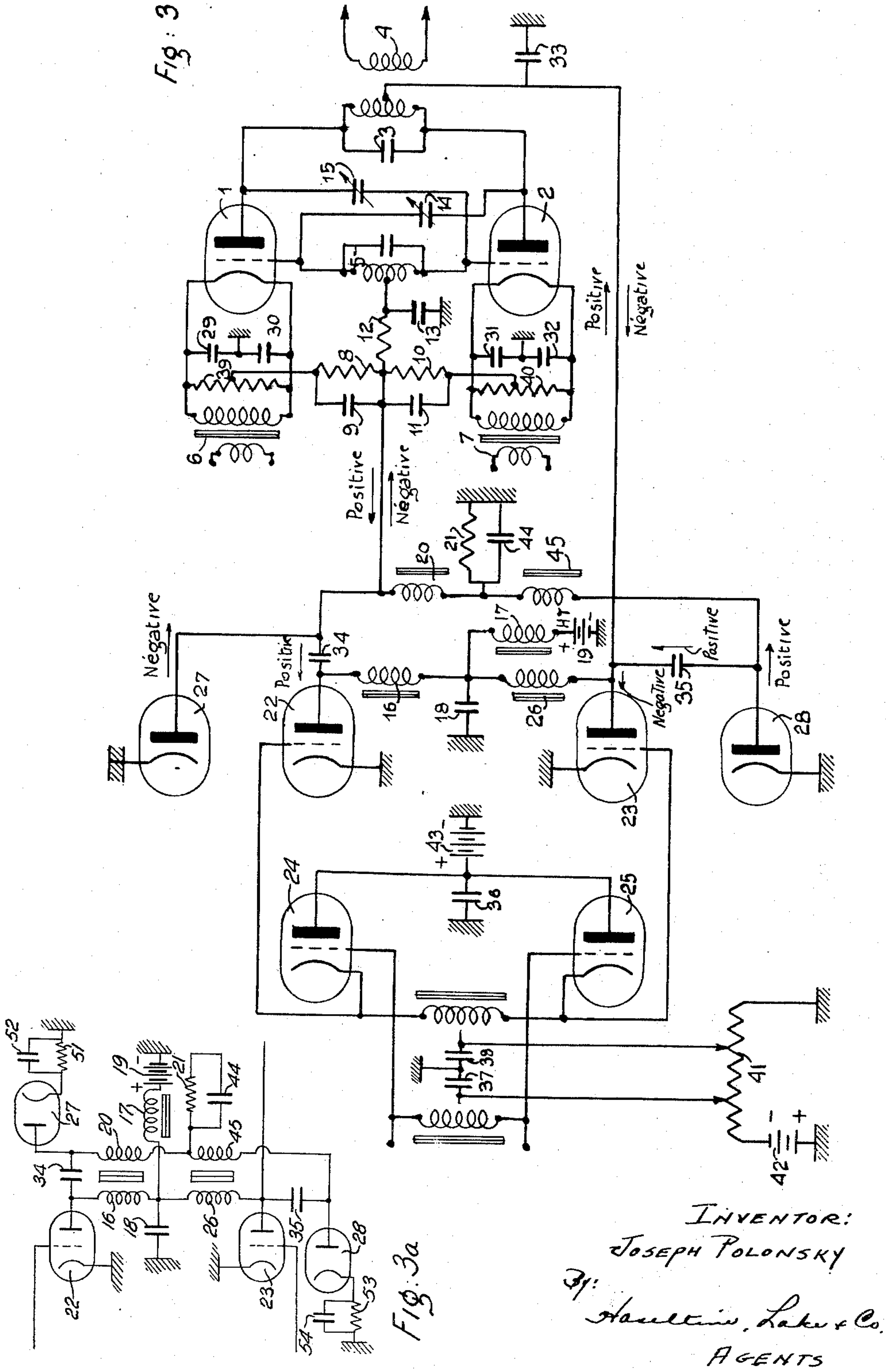
Fig. 3 is the diagram of an embodiment of the invention.
Fig. 3A is a modification of the embodiment of Fig. 3.

An embodiment of the invention is shown diagrammatically in Fig. 3.

In this figure, the modulated stage comprises the tubes 1 and 2, the anode oscillating circuit 3 with the loading circuit (feeder or antenna) 4, the high-frequency excitation circuit 5, the heater transformers 6 and 7, the automatic cathode-bias resistances and capacities 8, 9, 10 and 11, the automatic grid-bias resistance and capacity 12 and 13, the neutrodyne condensers 14 and 15.

The low-frequency modulation voltage is fed for the positive crests to the cathodes and for the negative crests to the anodes of the modulated stage.

The D. C. anode voltage from 19 is fed to each of the tubes 22 and 23 through one of the two low-frequency chokes 16 and 26, and the filter comprising the choke 17 and the condenser 18.

The cathodes of the tubes 1 and 2 are connected to ground through the junction point of the low-frequency chokes 20 and 45 (not coupled to one another) and the resistance 21 shunted by a condenser 44 that enables the low-frequency currents to pass readily.

The class B modulator comprises the tubes 22 and 23 which are excited in phase opposition by the tubes 24 and 25 connected to them by means of a cathodyne coupling.

The modulator furthermore comprises the vacuum or preferably gas-filled rectifying tubes 27 and 28 which can supply an instantaneous current equal to that of the tubes 22 and 23.

The function of these rectifying tubes is to enable the low-frequency current of the modulated stage to flow to ground. The tube 27 allows the low-frequency current of the modulated stage to pass during the low-frequency negative half-cycle, the tube 22 being non-conducting; the tube 28 allows the low-frequency current of the modulated high-frequency stage to pass during the low-frequency positive half-cycle, the tube 23 being non-conducting.

The reference numerals 29 to 38 denote blocking or filtering condensers, 39 and 40 centre-tapped resistances, 41 a grid-bias resistance connected across the terminals of the source 42. 43 is the common high-tension source for the tubes 24 and 25.

The modulated stage operates, as regards the high-frequency, under the same conditions as with the usual class B transformer arrangement.

The cathodes of the tubes 1 and 2 are at the ground high-frequency potential. The high-frequency excitation is fed between the grids and ground. The load (antenna or feeder) is coupled to the anode oscillating circuit. Said circuit may be symmetrical (as in Fig. 3) or asymmetrical.

Contrary to the usual arrangement, the low-frequency modulation voltage is supplied to the anodes on the one hand, and to the cathodes of the modulated stage on the other hand. The arrows marked positive show the direction of flow of the low-frequency current of the modulated stage during the positive half-cycle, those marked negative during the negative half-cycle.

During the positive half-cycle of modulation the tubes 22 and 28 are operative. The first, which is biassed for class B operation, receives a positive low-frequency voltage on its grid and develops, between its anode and ground, a negative low-frequency voltage, the amplitude of which may reach about 80% of the value of the D. C. anode voltage. This low-frequency voltage is fed between the cathodes of the tubes 1 and 2 and ground. Since the modulated stage is essentially biassed by the cathode resistances 8 and 10, the low-frequency amplitude thus supplied may be sufficient to modulate the high-frequency stage to a degree of nearly 100%.

The low-frequency current of the modulated stage flows to ground on the anode side through the rectifying tube 28 which is positively biassed with respect to ground by means of the resistance 21 through which the direct current of the modulated stage flows. On the other hand, the rectifying tube 27 is rendered non-conducting during the positive half-cycle of modulation, owing to the voltage between its anode and ground being made momentarily negative by the modulating tube 22. Similarly, the tube 23 is non-conducting since it is biassed for class B operation and is excited during this half-cycle by a negative low-frequency voltage.

During the negative half-cycle of modulation:

The tubes 23 and 27 are operative. The operation of these tubes is respectively similar to that of the tubes 22 and 28, during the positive half-cycle of modulation.

The tube 23 is supplied with a positive low-frequency excitation. It develops between its anode and ground a negative low-frequency voltage which is integrally fed to the anodes of the modulated stage. The low-frequency current of the tubes 1 and 2 flows to ground through the rectifier 27 which is positively biassed by 21.

The tube 22 is non-conducting since it is excited by a negative low-frequency voltage, and the tube 28 is non-conducting since it is negatively biassed by the low-frequency voltage developed by the tube 23.

In other words, during each half-cycle, one of the modulator tubes (22 or 23) is operative, the other being rendered non-conducting. The voltage developed on the plate of the operative tube renders the rectifying tube located near it (27 or 28 respectively) non-conducting, while the other rectifying tube allows the low-frequency current of the final stage to return to ground.

The arrangement of the premodulating stage equipped with the tubes 24 and 25 is well known. In order to decrease the non-linear distortion of the modulator, caused by the grid-current of the tubes 22 and 23, said tubes are coupled to the premodulator by means of the so-called cathodyne circuit.

The invention can be applied to other embodiments than the one which has just been described by way of a non-limitative example. In particular, the modulated stage need not necessarily be symmetrical and the expert can easily devise and construct an arrangement of the same kind with a single modulated tube. It is also possible to use multi-electrode tubes and, as regards the rectifiers 27 and 28, use may be made of rectifiers which are not tubes, or on the contrary of triodes or multi-electrode tubes. On the other hand, for the sake of economy, the choke 20 may be wound on the core of the choke 16, and likewise the choke 45 on the core of the choke 26. Such an embodiment is illustrated in Fig. 3A.

In particular, in order to join together more perfectly the two half-cycles, it has been found that it is useful to insert a resistor shunted by a condenser in series with each rectifying tube 27, 28 either in the anode circuit or in the ground connection of the cathode, the reactance of said condenser being negligible with respect to the resistance in shunt for all modulation frequencies having to be transmitted. An embodiment of this arrangement is illustrated in Fig. 3A, wherein 51 and 53 designate said resistors and 52 and 54 said condensers.

From the technical standpoint, the invention has great advantages as regards the phase rotation for ultra sonic and infra-sonic frequencies, situated respectively above and below the range of audible frequencies, and the degree of negative feed-back that can be applied to the transmitter can thereby be considerably increased as compared with the degree that can be obtained with the usual transformer arrangement.

What I claim is:

1. An anode control modulation device, which comprises a modulated stage including a tube having an anode and a cathode, a modulating stage provided with two symmetrically connected tubes each having an anode and a cathode and adapted to operate according to the class B method, a coupling provided with means for enabling low-frequency signals to pass and extending from the anode of one of the tubes of the modulating stage to the cathode end of the modulated stage, a similar coupling extending from the anode of the other modulating tube to the anode end of the modulated stage, two rectifying tubes connected by means of capacitative couplings between the respective anodes of the modulating stage and ground, means for automatically biassing the modulated stage by the cathode current of said stage, and means for feeding to said rectifying tubes a voltage obtained from said automatic biassing means.

2. An anode control modulation device, which comprises a symmetrical modulated stage provided with two tubes each having an anode and a cathode, a modulating stage provided with two symmetrically connected tubes each having an anode and a cathode and adapted to operate according to the class B method and including a system of chokes and capacities connected in the anode circuit of said modulating tubes so as to enable a direct current potential to be applied thereto and further including means for stopping the flow of low-frequency currents through said anode circuit, a capacitative coupling extending from the anode of one of the tubes of the modulating stage to the cathode end of the modulated stage, a direct connection between the junction point of the anode side of the modulated stage and the other anode of the modulating stage, two rectifying tubes each having a cathode connected to the ground and an anode connected, by means of capacitive couplings, to the anodes of the modulating stage, two series-connected low-frequency chokes connecting the cathode end of said modulated stage to the anode of that rectifying tube which is coupled by a capacitative coupling to the tube of the modulating stage connected to said direct connection, and a resistance shunted by a capacity, connected between ground and the junction point of said two chokes.

3. An anode control modulation device, which comprises a symmetrical two-tube modulated stage having an anode end and a cathode end, a modulating stage provided with two symmetrically connected tubes each having an anode and a cathode and adapted to operate according to the class B method and including a system of three chokes connected at one end with a common point and a capacity connecting said point to ground, the other ends of said chokes being respectively connected to a source of direct current potential and to the anodes of the tubes of the modulating stage, a capacitative coupling extending from the anode of one of the tubes of the modulating stage to the cathode end of the modulated stage, a direct connection between the junction point of the anode end of the modulated stage and the other anode of the modulating stage, two rectifying tubes each having a cathode connected to the ground and an anode connected, by means of capacitative couplings, to the anodes of the modulating stage, two series-connected low-frequency chokes connecting the cathode end of said modulated stage to the anode of that rectifying tube which is coupled by a capacitative coupling to the tube of the modulating stage connected to said direct connection, said series-connected chokes being respectively wound on the same magnetic core as the choke of said system, which is connected to the anode of the corresponding tube of the modulating stage, and a resistance shunted by a capacity, connected between ground and the junction point of said two chokes.

4. An anode control modulation device including a modulated tube with a cathode, a grid and an anode, means for applying to said grid a high frequency voltage, two modulating tubes mounted for operating in class B and alternately supplying voltage pulses at a low frequency of modulation, means for causing these voltage pulses to act in the anode circuit of the modulated tube so as to obtain in said anode circuit a modulated high frequency current a component of which is at the low frequency of modulation, said last means comprising substantially non-inductive coupling means for feeding the voltage pulses supplied by one of the modulating tubes to the anode of the modulated tube, and the voltage pulses supplied by the other modulating tube to the cathode of the modulated tube, and two valve members so adapted and mounted as to offer, alternately and concomitantly with the operation of the modulating tubes, a path of flow for the low frequency component of the modulated high frequency current.

5. A device as claimed in claim 4, including a common source of direct current potential for feeding the respective anodes of the modulating tubes and of the modulated tube, and means for biasing positively the cathode of the modulated tube.

6. A device as claimed in claim 2, wherein a resistor shunted by a condenser is inserted, in series with each rectifying tube, in the connection between the ground and each end of the two said series-connected chokes.

JOSEPH POLONSKY.

No references cited.